United States Patent
Dasgupta et al.

(10) Patent No.: US 8,482,338 B1
(45) Date of Patent: Jul. 9, 2013

(54) SHOCK DETECTOR WITH DC OFFSET SUPPRESSION USING INTERNAL COMPONENTS

(75) Inventors: Uday Dasgupta, Singapore (SG); Yayue Zhang, Singapore (SG)

(73) Assignee: Marvell International Ltd. (BM)

( * ) Notice: Subject to any disclaimer, the term of this patent is extended or adjusted under 35 U.S.C. 154(b) by 2183 days.

(21) Appl. No.: 11/417,414

(22) Filed: May 3, 2006

Related U.S. Application Data

(60) Provisional application No. 60/726,379, filed on Oct. 13, 2005.

(51) Int. Cl.
*G01N 27/04* (2006.01)
(52) U.S. Cl.
USPC ............................. 327/512; 327/511; 327/509
(58) Field of Classification Search
USPC ................. 327/509–517; 360/69, 31
See application file for complete search history.

(56) References Cited

U.S. PATENT DOCUMENTS

| | | | | |
|---|---|---|---|---|
| 6,011,415 A | * | 1/2000 | Hahn et al. .................... | 327/103 |
| 7,285,961 B2 | * | 10/2007 | Shinmoto et al. ............. | 324/541 |
| 7,453,660 B2 | * | 11/2008 | Tanner ............................ | 360/69 |
| 7,466,119 B2 | * | 12/2008 | Ito et al. ...................... | 324/76.13 |
| 7,551,170 B2 | * | 6/2009 | Eaton ............................ | 345/207 |

OTHER PUBLICATIONS

Nagaraj, K., "A Parasitic-Insensitive Area-Efficient Approach to Realizing Very Large Time Constants in Switched-Capacitor Circuits" *IEEE Transactions on Circuits and Systems* (Sep. 1989) 36(9):1210-1216.

Nagaraj, K., "A Parasitic-Insensitive Area-Efficient Approach to Realizing Very Large Time Constants in Switched-Capacitor Circuits," IEEE Transactions on Circuits and Systems, 36(9):1210-1216 (1989).

* cited by examiner

*Primary Examiner* — Dinh T. Le

(57) ABSTRACT

A shock detector, such as for disk drives, which eliminates discrete external capacitors used in prior art devices. A first stage operational amplifier (without external capacitors) provides part of the gain required. This is followed by a second stage switched capacitor high pass filter (without external capacitors) that provides the remaining gain required while filtering out the DC offset of the first stage operational amplifier. In order to cover the range of frequencies expected without aliasing problems, two switched capacitor high pass filters in parallel are used, each designed with a different cut-off frequency.

20 Claims, 15 Drawing Sheets

SHOCK DETECTOR WITH DC OFFSET SUPPRESSION USING INTERNAL COMPONENTS

CROSS-REFERENCES TO RELATED APPLICATIONS

This application claims priority from provisional application No. 60/726,379, entitled "Shock Detector With DC Offset Suppression Using Internal Components", filed on Oct. 13, 2005.

BACKGROUND OF THE INVENTION

The present invention relates to motion detectors, and in particular to integrated circuit shock detectors for disk drives.

A shock detector for hard disk drives senses movement of the disk drive. A traditional implementation is shown in FIG. 1. It uses a piezo transducer 10 to provide an electrical charge proportional to acceleration. This charge is converted into a voltage using the operational amplifier 12 in conjunction with external components: resistor 14, capacitor 16, resistor 18 and capacitor 20. The voltage is subsequently amplified (typically 40 times) using operational amplifier 22 in conjunction with internal resistors 24, 26 and external capacitor 28. Next, it is low-pass filtered using a 2nd order network low pass filter 29 of resistors 30, 32 and capacitors 34, 36 (all internal) with a cut-off frequency of $f_{LP}$ (typically 15 KHz). Finally the signal is amplified again (typically 15 times) using operational amplifier 38 in conjunction with resistors 40, 42 (internal) and capacitor 44 (external).

Capacitors 28 and 44 help to form a 2nd order high-pass response cut-off frequency $f_{HP}$ (typically 60 Hz.). In addition to this, they reduce the DC closed-loop gain of amplifiers 22 and 38 to unity, thus preventing amplification of their DC input-referred offset voltages. This is very important; otherwise, a typical DC offset voltage of 5 mV at the input of amplifier 22 would be amplified to 5 mV×40=200 mV at the output of amplifier 22 and 5 mV×40×15=3V at the output of amplifier 38. With a $V_{DD}$ of 5V and $V_{DD}/2$ of 2.5V, this is enough to saturate amplifier 38, although amplifier 22 will be able to operate normally.

Finally, the amplified signal (typically a total amplification of 600 times at the output of amplifier 38) is fed into a window comparator composed of comparators 46 and 48 and an OR gate 50. The comparator compares the signal against a threshold window of width $2V_R$ (typically 10% of $V_{DD}$) about the common reference voltage $V_{DD}/2$ where $V_{DD}$ is the power supply voltage to the chip. Therefore, a valid movement is detected at OUT whenever the peak value of the amplified signal exceeds $V_R$. For a $V_{DD}$ of 5V, $V_R$=0.25V.

At this point, it is to be noted that any DC offset exceeding a magnitude of $V_R$ at the output of amplifier 38 will trip either of the comparators 46 or 48 resulting in a false output even without any signal from transducer 10. With the help of capacitors 28 and 44 it can be ensured that the DC offset voltage at the output of amplifier 38 is no more than the input referred offset of an op-amp (typically 5 mV).

A disadvantage of this circuit is the number of external components. Bringing some external components inside would reduce the number of external components as well as the pin count cost. However, all the external components (resistors 14 and 18, and capacitors 16, 20, 28 and 44) are too large in value to be directly integrated.

BRIEF SUMMARY OF THE INVENTION

The present invention provides in various embodiments a shock detector, such as for disk drives, which eliminates discrete external capacitors used in prior art devices. A first stage operational amplifier (without an external capacitor) provides part of the gain required. This is followed by a second stage switched capacitor high pass filter (with no external capacitors) that provides the remaining gain required, while filtering out the DC offset of the first stage operational amplifier. In order to cover the range of frequencies expected without aliasing problems, two switched capacitor high pass filters in parallel are used, each designed with a different cut-off frequency. Thus, while a single switched capacitor high pass filter would experience aliasing problems trying to cover the desired frequency ranges, the invention provides two, for high and low frequencies within the desired range, so that a second one can take over when the first starts experiencing aliasing problems.

In one embodiment, most of the needed amplification is done by the first stage operational amplifier, such as a gain of around 40×. This allows the majority of the DC offset from the gain to be eliminated by the high pass filtering of the switched capacitor circuit. A remaining gain of around 15× by the second stage switched capacitor filters gives the needed total amplification of around 600×, while using standard switched capacitor filters that have little or no DC offset. The switched capacitor filters are designed to have a Figure of Merit (FOM) of around 100.

In one embodiment, a low pass filter is moved in front of the first stage operational amplifier. The low pass filter operates on the transducer signal after it has been initially converted from a current to a voltage. The outputs of the two switched capacitor high pass filters are each provided to comparator circuits. The comparator outputs are provided to Boolean logic, with an OR function, to select when either of the comparators shows the shock transducer signal exceeding a predetermined threshold.

DETAILED DESCRIPTION OF THE INVENTION

Figure 1:
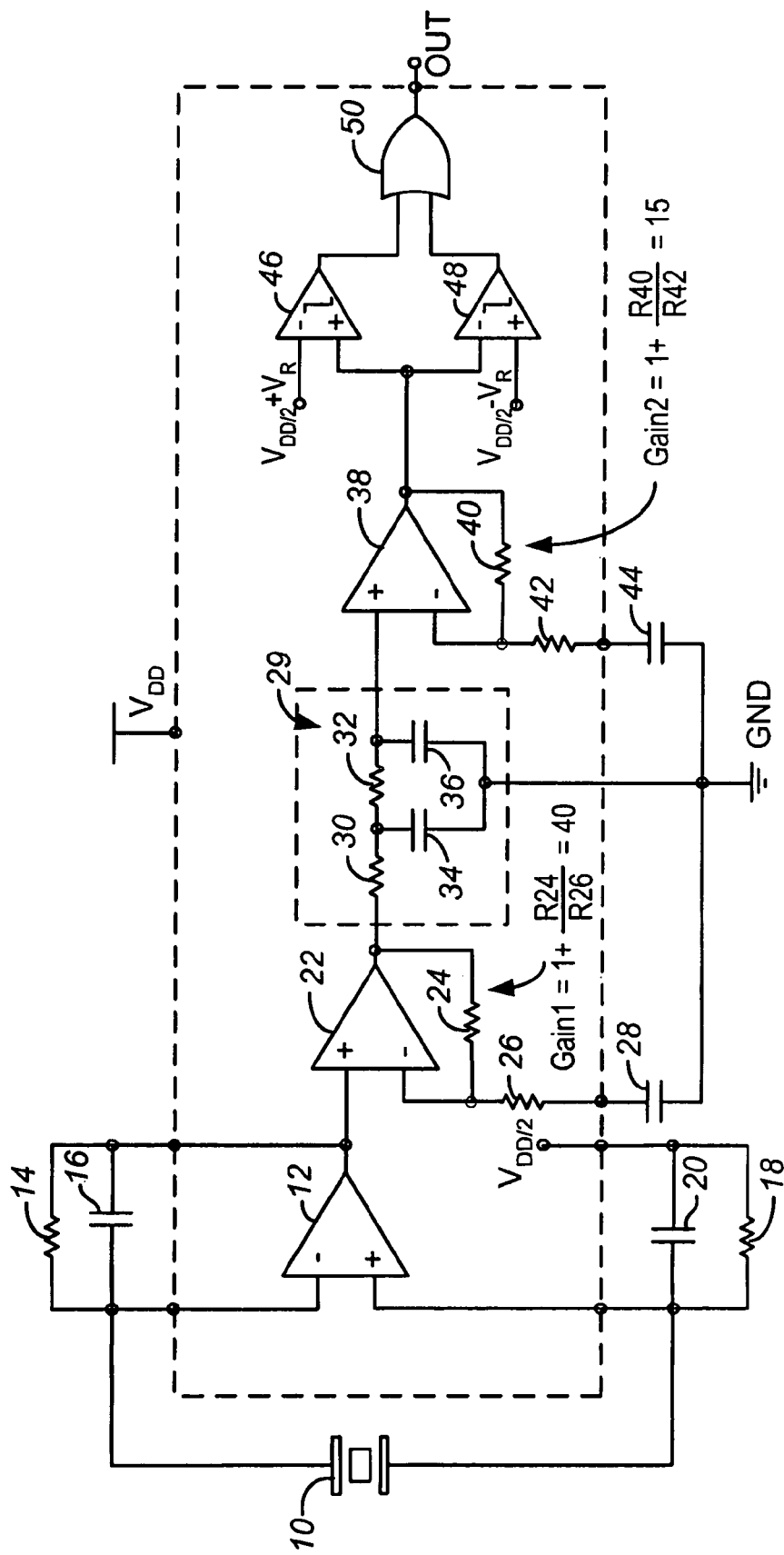
FIG. 1 is a block diagram of a prior art shock detector using external capacitors.
Figure 2:
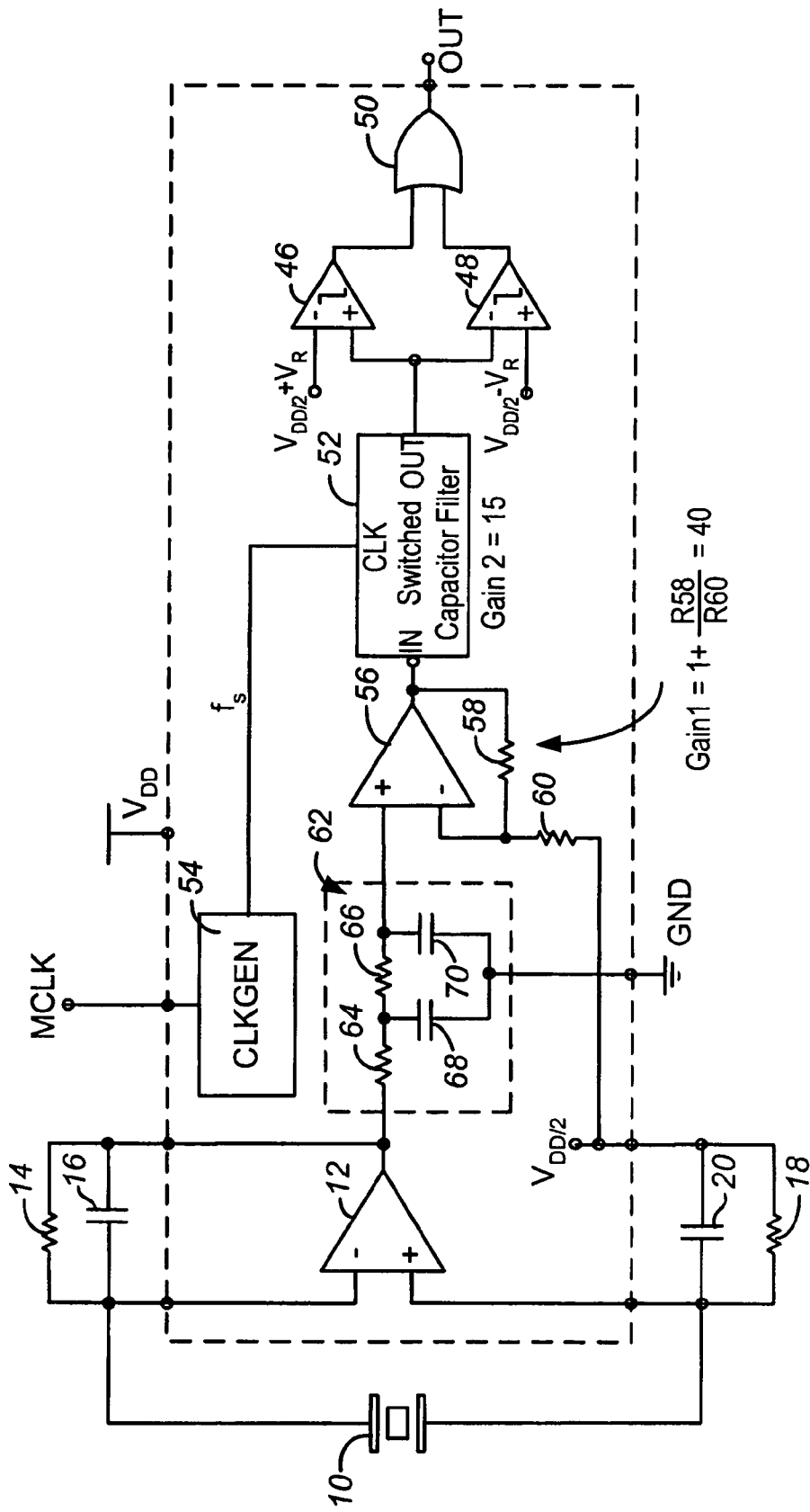
FIG. 2 is a block diagram of an embodiment of the invention eliminating external capacitors and using a high pass switched capacitor filter.

FIG. 2 is a block diagram of an embodiment of the invention. FIG. 2 shows how it is possible to remove the capacitors 28 and 44 of the prior art shown in FIG. 1, and also save two terminals or pins. The high-pass functions of amplifiers 22 and 38 achieved in conjunction with capacitors 28, 44. The gain provided by amplifier 38 in FIG. 1 is implemented in FIG. 2 using a switched-capacitor high-pass filter 52 that replaces amplifier 38. Now amplifier 22, as discussed above, will be able to operate normally. The DC offset of 200 mV at the output of amplifier 22 will be suppressed by the high-pass response of switched-capacitor high-pass filter 52 and will not appear at its output. If designed properly, the DC offset at the output of switched-capacitor high-pass filter 52 should be no more than the input referred offset of an op-amp (typically 5 mV).

The switched capacitor high pass filter 52 receives a clock signal from a clock generator 54, which runs off of a system clock MCLK, which is generated on the same integrated circuit. The positions of the low pass filter and the operational amplifier 22 of FIG. 1 are reversed in FIG. 2, with an operational amplifier 56 and associated resistors 58 and 60 being inserted after low pass filter 62. The low pass filter is made up of, for example, the network of resistor 64, 66 and capacitors 68, 70. As one of ordinary skill in the art will realize, other types of low pass filters may be employed. Note that the external capacitors 28 and 44 of FIG. 1 are eliminated. The positions of the first stage amplifier and the low pass filter are switched because the switched capacitor filter 52 needs a low impedance drive which is provided more adequately by the operational amplifier 56 compared to the low pass filter 62.

To implement the switched capacitor high pass filter network (HPFN) 52. The considerations are as follows:

(1) For a switched-capacitor implementation we need to sample the input signal greater than twice the maximum signal frequency present in the signal to prevent signal distortion known as aliasing. The input signal is filtered using the low-pass filter (LPF) 62 having a cut-off frequency $f_{LP}$. The maximum frequency of interest for the input signal should be that frequency at which the response of the LPF goes just below the detection threshold $V_R$. If the maximum peak value of the signal at the output of amplifier 38 is $V_{DD}/2$, and the required sampling frequency is $f_S$, then for a second order LPF, it can be shown, to neglect aliasing effects we need to have:

$$\left(\frac{f_s}{2f_{LP}}\right)^2 \geq \frac{V_{DD}}{2V_R} \quad (1)$$

With $V_{DD}/2V_R=10$ and $f_{LP}=15$ KHz and using (1) we conclude that the sampling frequency $f_S$ should be greater than 95 KHz. Let us take $f_S=100$ KHz.

(2) To compare different switched-capacitor implementations, let us define a figure of merit indicating the amount of the silicon area required for an implementation.
Figure of merit (FOM)=ratio of the maximum switched capacitor value to the minimum switched capacitor value. This can be shown to be:

$$FOM = \frac{G_2 f_s}{2\pi K f_{HP}} \quad (2)$$

Where $f_{HP}$ and $G_2$ are the cut-off frequency and pass-band gain of switched-capacitor high-pass filter 52, respectively. K is a dimensionless constant ($\geq 1$) depending on the implementation. Obviously, implementations having lower values of FOM are more area-efficient. FOM values of around 100 or less are acceptable.

(3) The high-pass cut-off frequency of switched-capacitor high-pass filter 52 is $f_{HP}=60$ Hz in one embodiment. This frequency is too low to be implemented successfully on-chip. For a conventional implementation, K=1 (fixed and cannot be any different) and with $f_S=100$ KHz and $G_2=15$, we can calculate FOM using (2) to be 3980.

Figure 3:
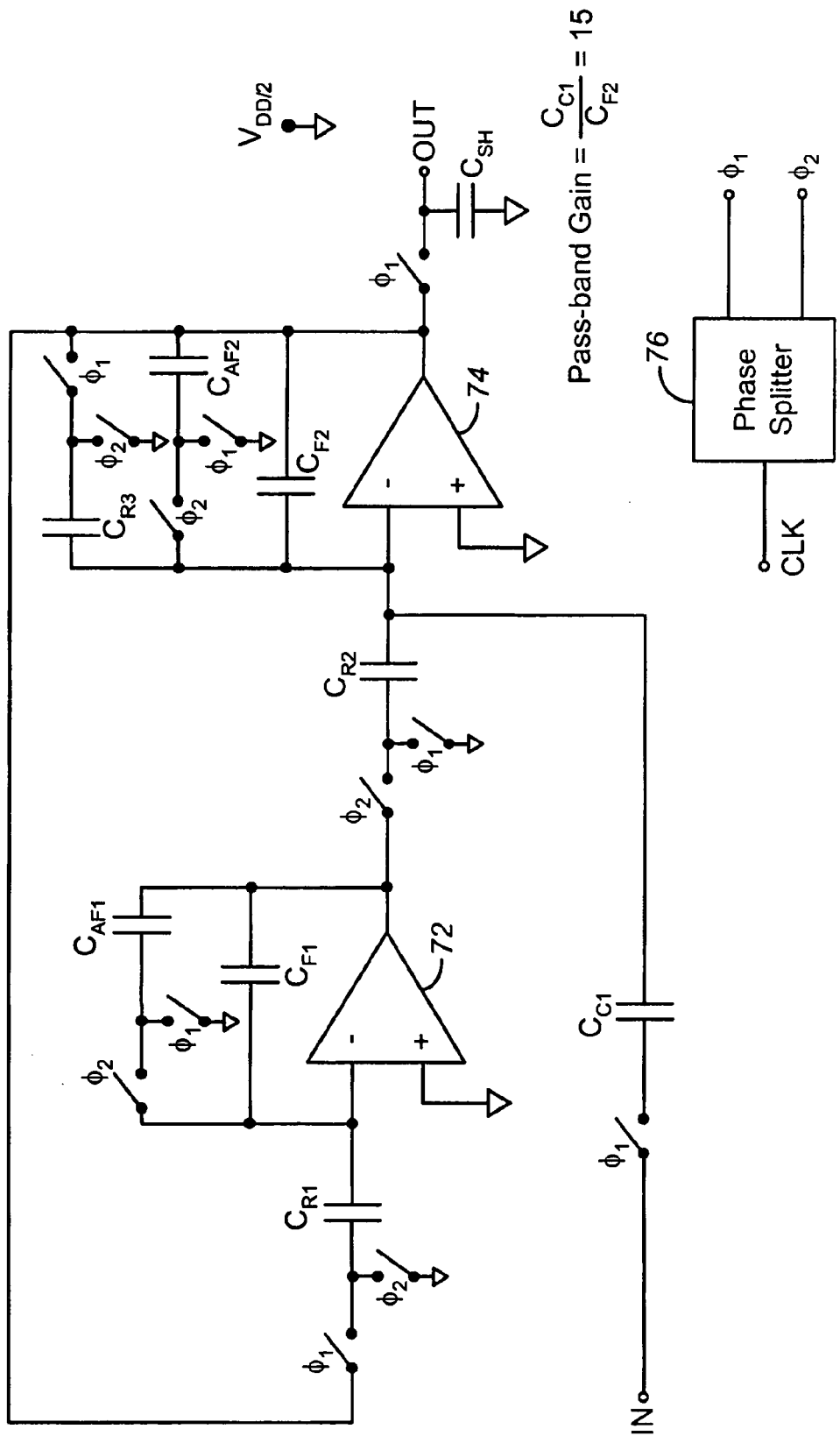
FIG. 3 is a block diagram of one embodiment using a Nagaraj circuit for the high pass switched capacitor filter of FIG. 2.

(4) A known technique for implementing area-efficient low frequency switched capacitor filters is described by K. Nagaraj (K. Nagaraj, "A Parasitic-Insensitive Area-Efficient Approach to Realizing Very Large Time Constants in Switched-Capacitor Circuits", IEEE Transactions on Circuits and Systems, vol. 36, no. 9, pp. 1210-1216, September 1989). FIG. 3 shows an implementation of switched-capacitor high-pass filter 52 using Nagaraj's technique. For this technique one can choose higher values of K. Using K=33, and equation (2), we can calculate the FOM to be 120. However this technique has a drawback: the DC offset at the output of switched-capacitor high-pass filter 52 is equal to about K times the input-referred offset of an op-amp. This is unacceptable as the DC offset is now 5 mV×33=165 mV and is comparable to $2V_R$ (typically 500 mV).

FIG. 3 illustrates the Nagaraj switched capacitor circuit which includes amplifiers 72 and 74 with their associated capacitors and switches. The switches are switched either during phase φ1 or phase φ2, with the phases being provided by a phase splitter 76.

Figure 4:
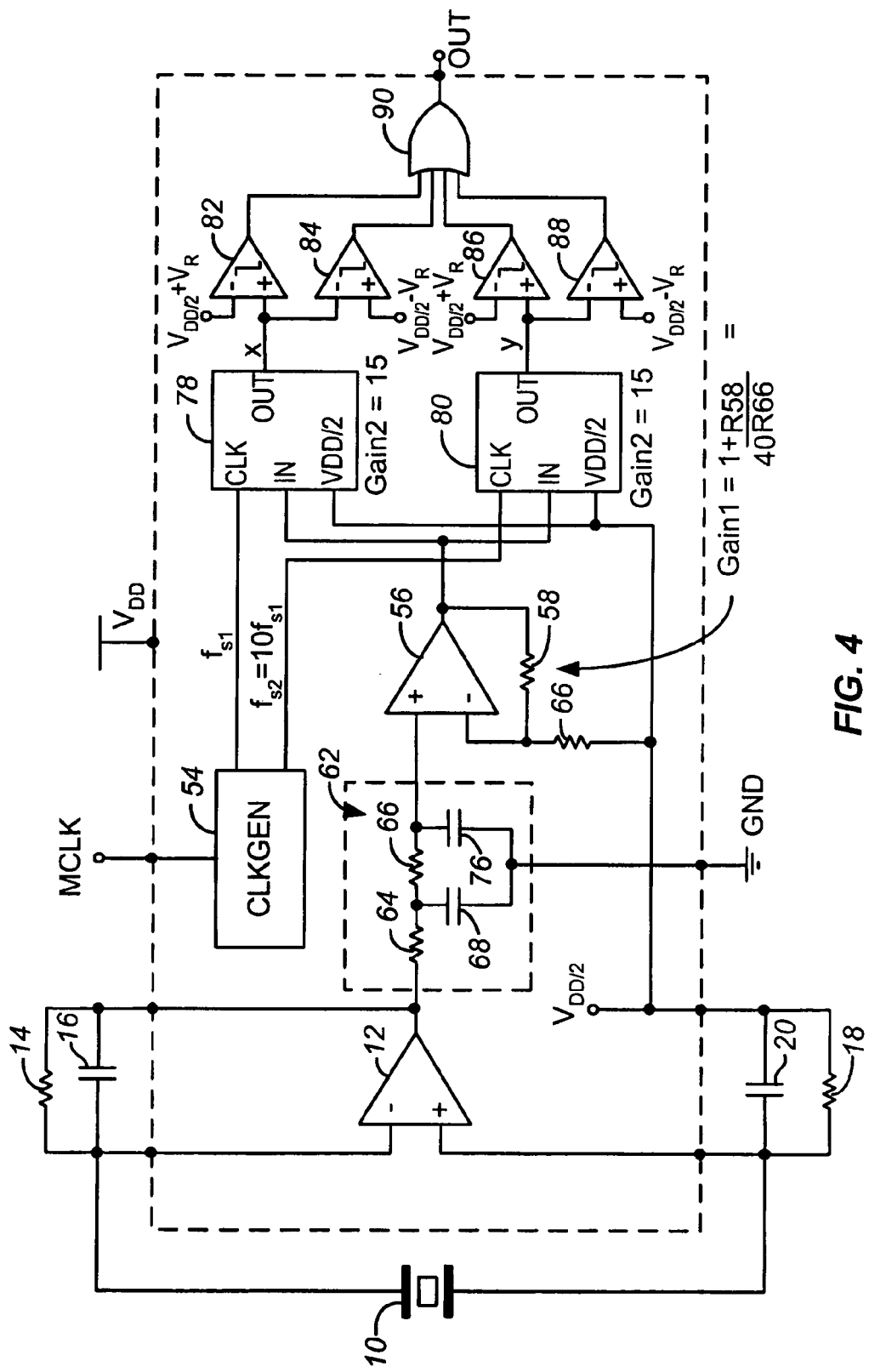
FIG. 4 is a block diagram of an embodiment of the invention modifying the embodiment of FIG. 2 by using two parallel switched capacitor filters.

FIG. 4 is a diagram of a preferred embodiment of the invention wherein the high pass switched capacitor filter 52 of FIG. 2 is implemented using two conventional switched capacitor filters 78 and 80 in parallel.

FIG. 4 shows the shock detector circuit without the external capacitors 28 and 44 of the prior art of FIG. 1. The switched capacitor filter 52 of FIG. 2 is implemented with two conventional (K=1) second-order switched capacitor high-pass filters 78 and 80 in operating in parallel paths on the signal from amplifier 56. Switched capacitor high-pass filter 78 is sampled using a lower frequency and switched capacitor high-pass filter 80 using a higher frequency. Thus, the first is able to realize a high-pass cut-off frequency of 60 Hz and the other is able to back-up the high-pass response up to 15 KHz, avoiding aliasing. They do not multiply their own input-referred offset like the technique described by Nagaraj. The outputs X and Y of the filters go to separate pairs of comparators 82, 84 and 86, 88. Finally the outputs of all the comparators are combined using an OR gate 90 to produce the final output of the shock detector. The responses of the filters are shown in FIG. 5.

Figure 5:
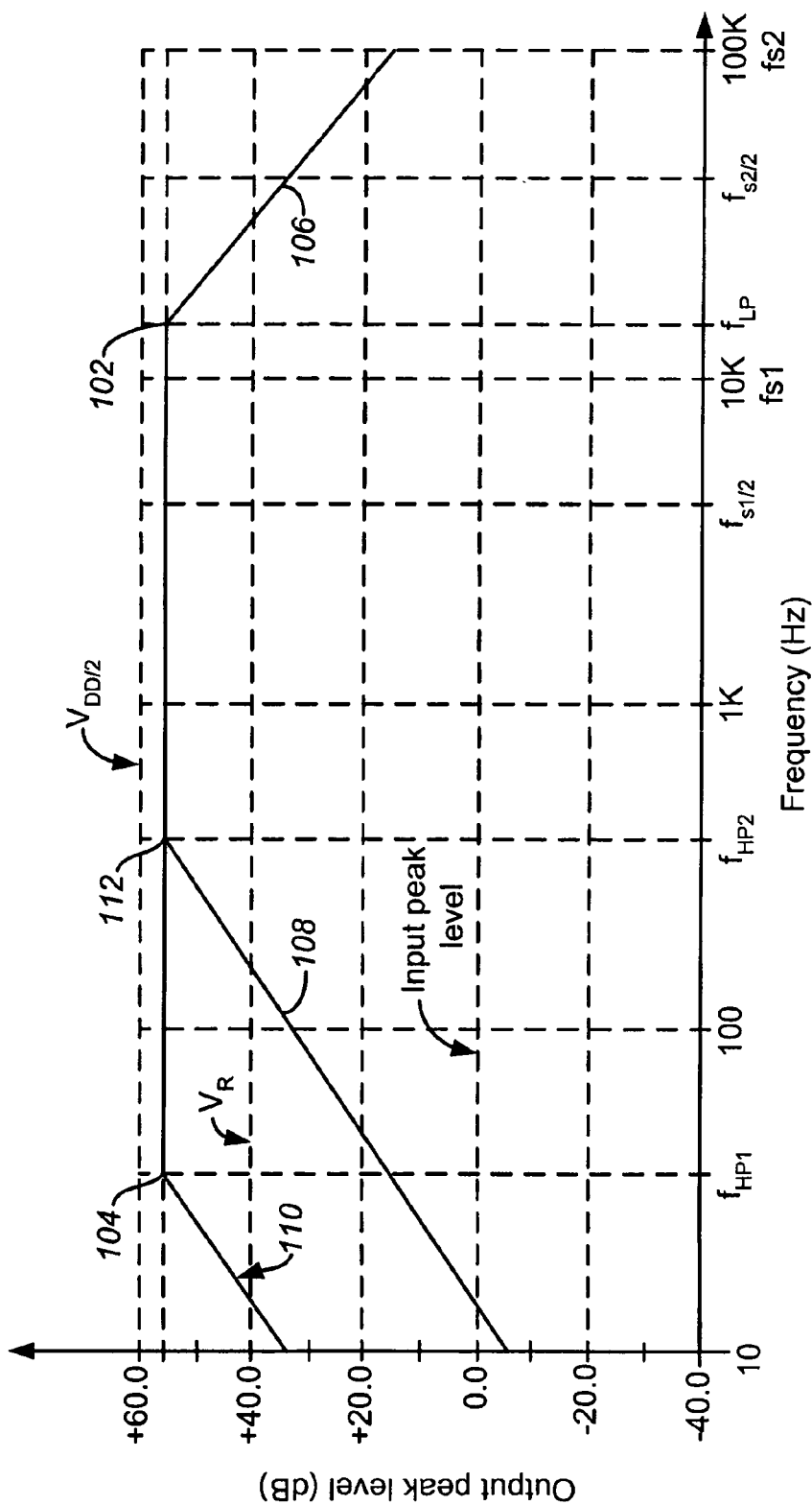
FIG. 5 is a graph illustrating the frequency response of the filters of FIG. 4.

FIG. 5 illustrates the responses of the filters, giving a passband between a point 102 and a point 104. A ramp signal 106 illustrates the low pass filter 62 cut-off, while a ramp 108 illustrates the cut-off of switched capacitor filter 80 and ramp 110 illustrates the cut-off frequency of switched capacitor filter 78. As can be seen, by using two different switched capacitor filters with two different cut-off frequencies, and overlapping passbands, the low frequency side of the passband is extended from a point 112 back to point 104.

Filter 78 is sampled at $f_{S1}$ and filter 80 at $f_{S2}$. Similar, or preferably identical, circuits are used for filter 78 and filter 80. If the high-pass cut-off frequencies are $f_{HP1}$ and $f_{HP2}$ respectively, then it can be shown that $$\frac{f_{S1}}{f_{S2}} = \frac{f_{HP1}}{f_{HP2}} \quad (3)$$

Figure 6:
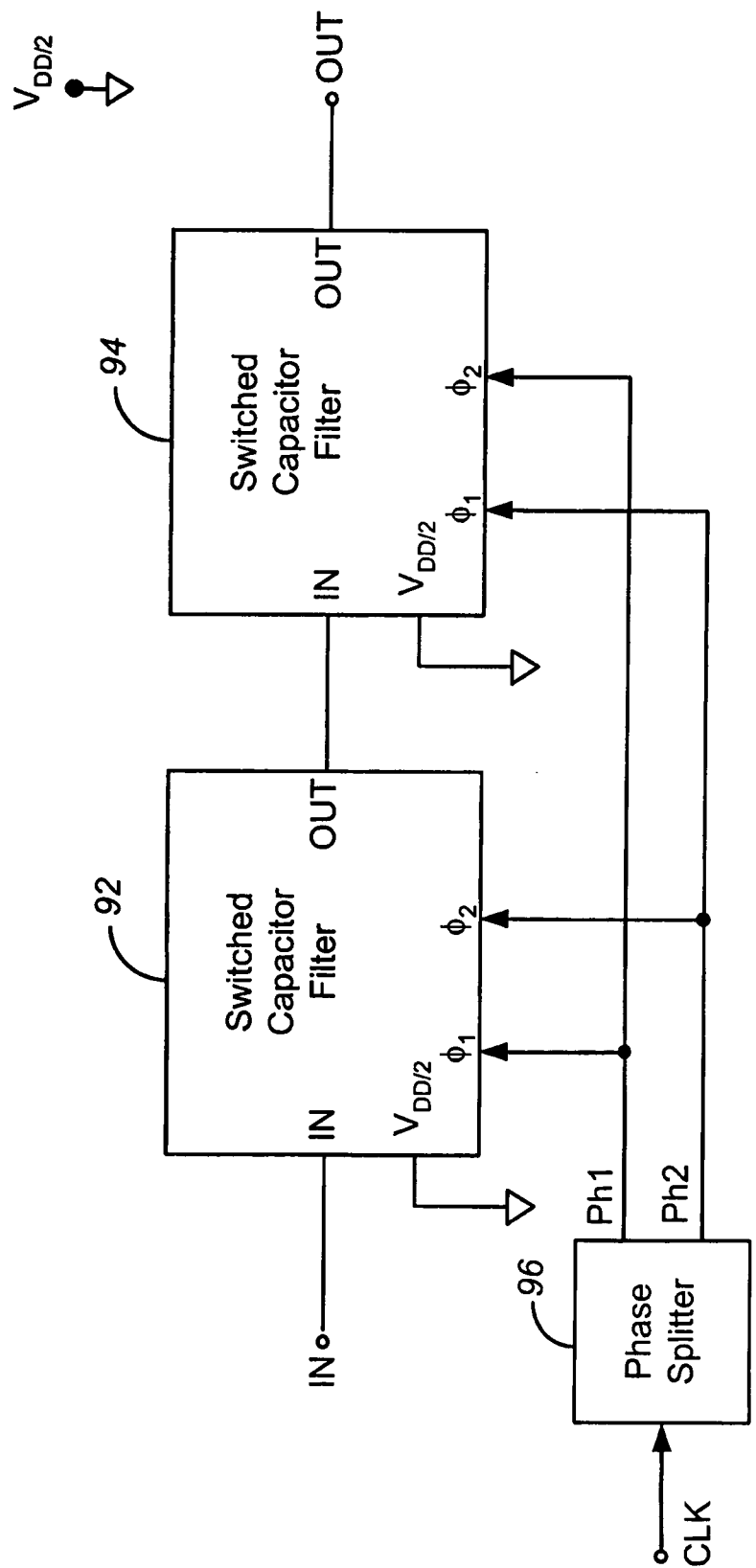
FIG. 6 is a high level block diagram showing the clock generation and input to the switched capacitor filters of FIG. 4.
Figure 7:
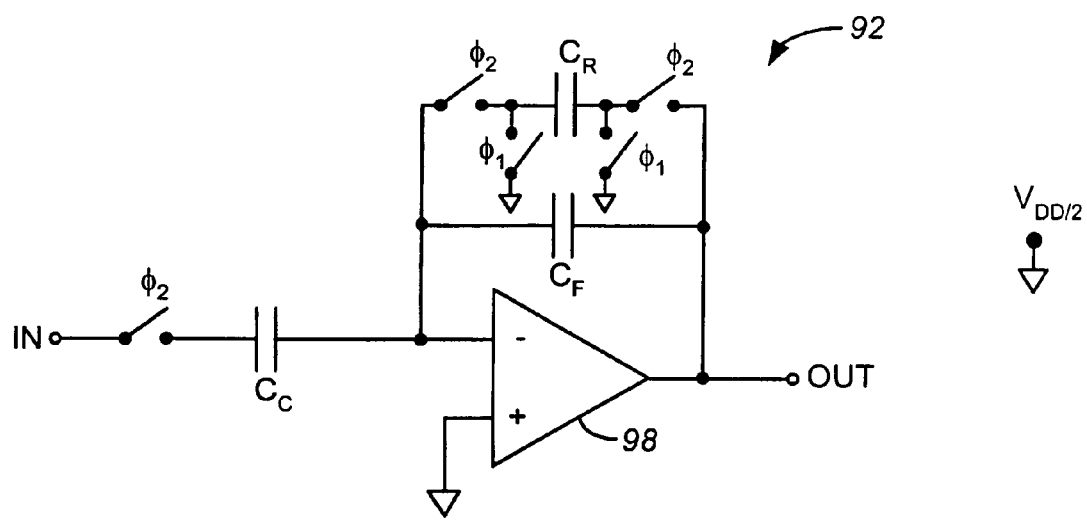
FIG. 7 is a block diagram of one embodiment of a switched capacitor filter for each of blocks 92 and 94 of FIG. 6.

As shown in FIG. 6, each of filter 78 and filter 80 consists of two conventional (K=1) identical first order filters 92 and 94 in cascade (FIGS. 6 and 7). The clock signals for the switches are provided by a phase splitter 76. If the pass-band gains of switched capacitor filters 78 and 80 are each $G_2$, then the same for first order filters 92 and 94 is square root of $G_2$. FIG. 7 is a diagram illustrating the circuitry of first order filters 92 and 94 of FIG. 6. Each of first order filters 92 and 94 is composed of the circuits shown, with an amplifier 98 and associated capacitors and switches. The passband gain of the circuit of FIG. 7 would be equal to $C_c/C_f=\sqrt{15}$ for both filters 92 and 94.

From equation (3) we can see that filter 78 can be designed to have $f_{HP}$=60 Hz by reducing its sampling frequency $f_{S1}$ compared to $f_S$ whereas filter 80 needs to have its sampling frequency $f_{S1}$ be equal to $f_S$ to prevent aliasing. In addition, in this embodiment, the pass-bands of filters 78 and 80 are overlapped as in FIG. 5, since their outputs, after comparison with $V_R$, are being combined using OR logic 90.

Referring to FIG. 5, the response of filter 78 will fail beyond $f_{S1}/2$ due to aliasing. Aliasing may or may not cause the comparators 82 or 84 to trip if the input signal is in the detectable range. However, if the input signal is below the detectable range, even with aliasing, the comparators will not trip. Therefore, we must have $f_{HP2}$ smaller than $f_{S1}/2$ so that switched capacitor filter 80 can take over with the OR logic. So we need to have:

$$f_{HP2} = \frac{f_{S1}}{2P} \quad (4)$$

where P is a dimensionless constant (>1) of our choice. Using (3) and (4) we can find $f_{HP2}$ and $f_{S1}$ in terms of known quantities $f_{HP1}$ and $f_{S2}$ such as:

$$f_{HP2} = \sqrt{\frac{f_{S2}f_{HP1}}{2P}} \quad (5)$$

$$f_{S2} = \sqrt{2Pf_{S2}f_{HP1}} \quad (6)$$

Upon calculation using equations (5) and (6) with P=10, $f_{HP1}$=60 Hz and $f_{S2}$=100 KHz, we find $f_{S1}$=10 KHz and $f_{HP2}$=500 Hz. The FOM for switched capacitor high-pass filters 78 and 80 can now be calculated using equation (2), K=1 and $G_2$=square root of 15, to be 103 each. This figure can be reduced further if P is chosen to be less than 10. On top of that the embodiment of FIG. 4 has DC offsets at X and Y equal to the input referred offset of an op-amp (5 mV) only. This is because the DC offset at the output of the amplifier 56 will be filtered out by high-pass filters 78 and 80 and they themselves do not amplify their own input-referred offset. Thus, unlike the embodiment using the Nagaraj circuit, the embodiment in FIG. 4 is practically feasible for this application.

FIGS. 8, 9, 10 and 11 show the simulation performances of the shock detector in FIG. 4 for input frequencies of 60 Hz, 1 KHz, 5 KHz and 15 KHz respectively. The conclusion is the shock detector is able to detect signals between 60 Hz and 15 KHz for $2V_R$=600 mV and peak-to-peak values 1.7 mV and above.

Figure 8A:
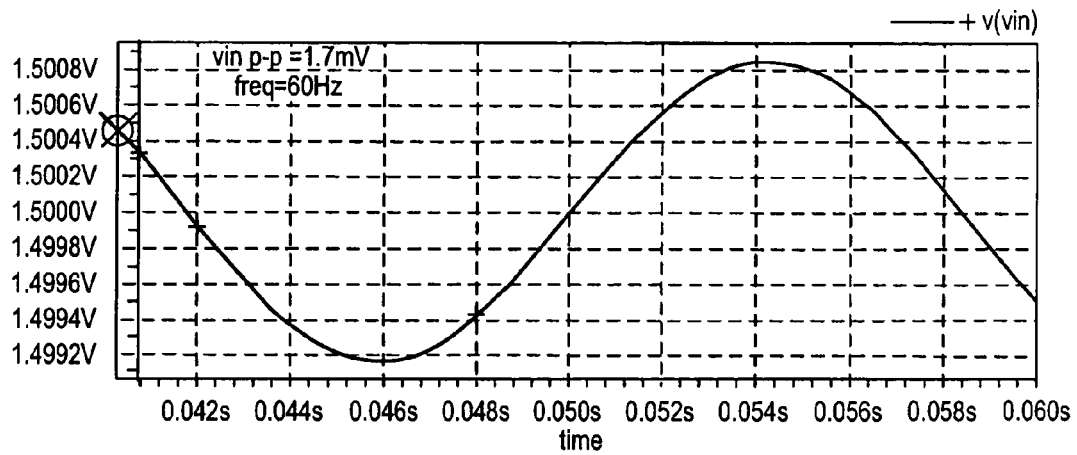
FIGS. 8A-C, 9A-C, 10A-C and 11A-C are graphs of simulation performances of a shock detector of FIG. 4 for input frequencies of 60 Hz, 1 KHz, 5 KHz and 15 KHz, respectively. Each of the figures has an A, B and C that show (A) the input peak-to-peak voltage, (B) the voltage after the first gain stage, and (C) the voltages after the two second gain stages, respectively.
Figure 8B:
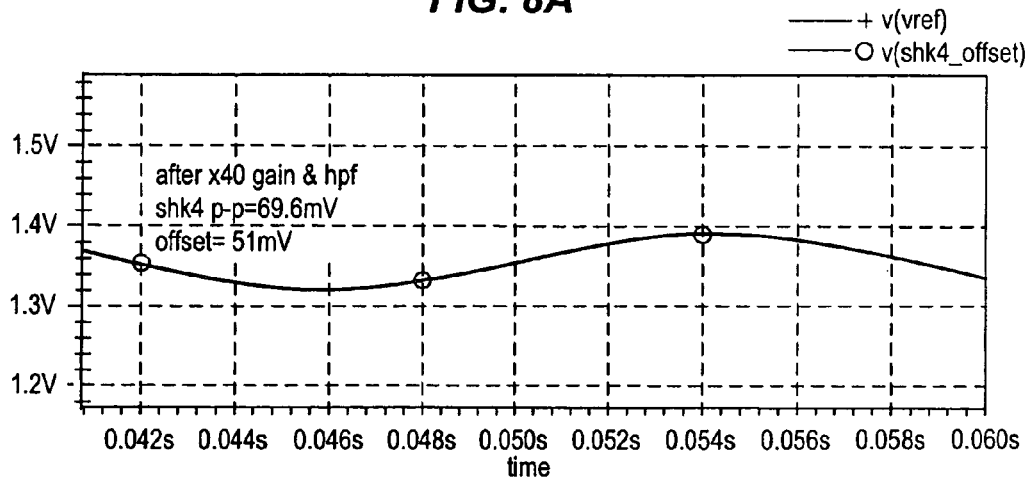
Figure 8C:
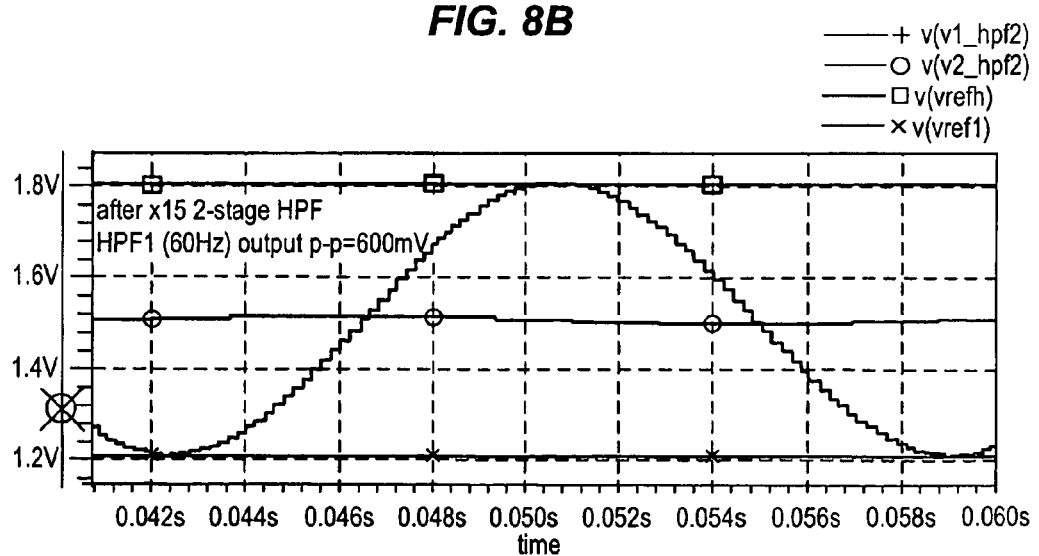

FIGS. 8A-8C show a simulation in which $f_{S1}$ was 5K and $f_{S2}$ was 50K. FIG. 8A shows the peak-to-peak input at a frequency of 60 Hz. FIG. 8B shows the signal at the output of the first stage operational amplifier 56 of FIG. 4. FIG. 8C shows the output after the second stage switched capacitor filter 78. In FIG. 8B, an offset of 151 mV is introduced because of amplifier 56. As shown in FIG. 8C, the offset is blocked by the high pass switched capacitor filter. As can be seen, the curve of FIG. 8C is just within the line of the two comparator thresholds which are shown at 1.8V and 1.2V, respectively.

Figure 9A:
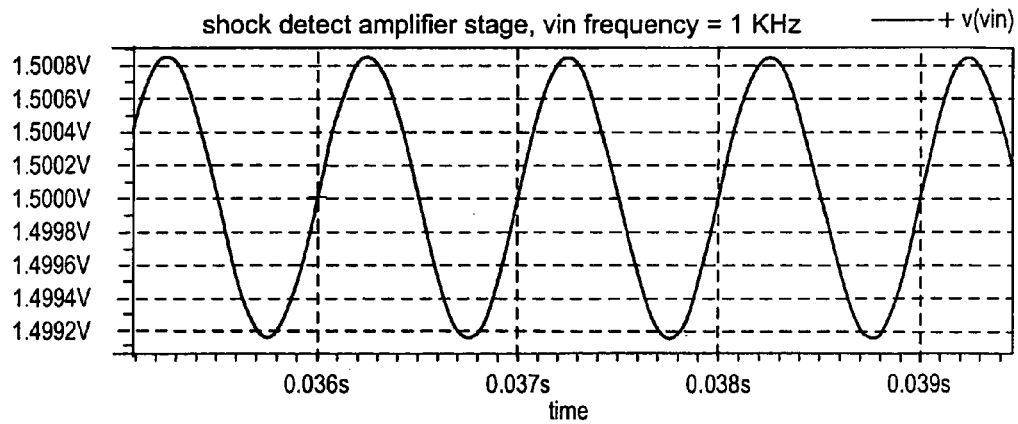
Figure 9B:
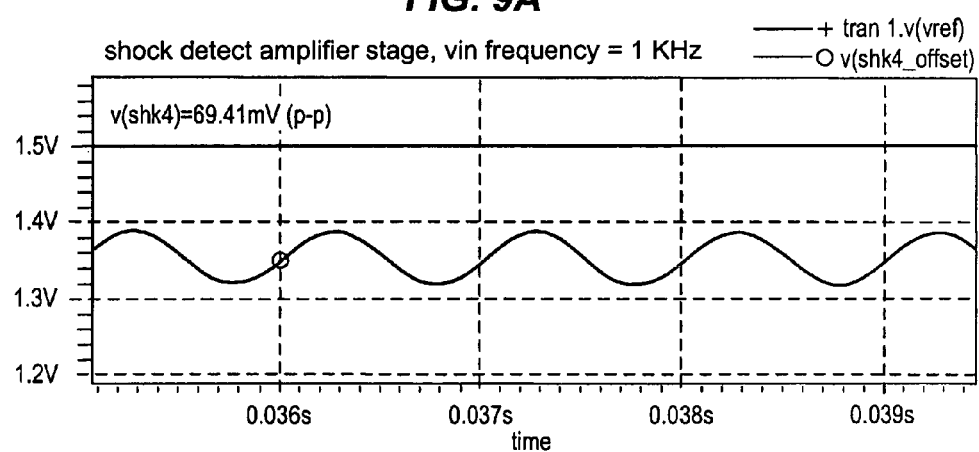
Figure 9C:
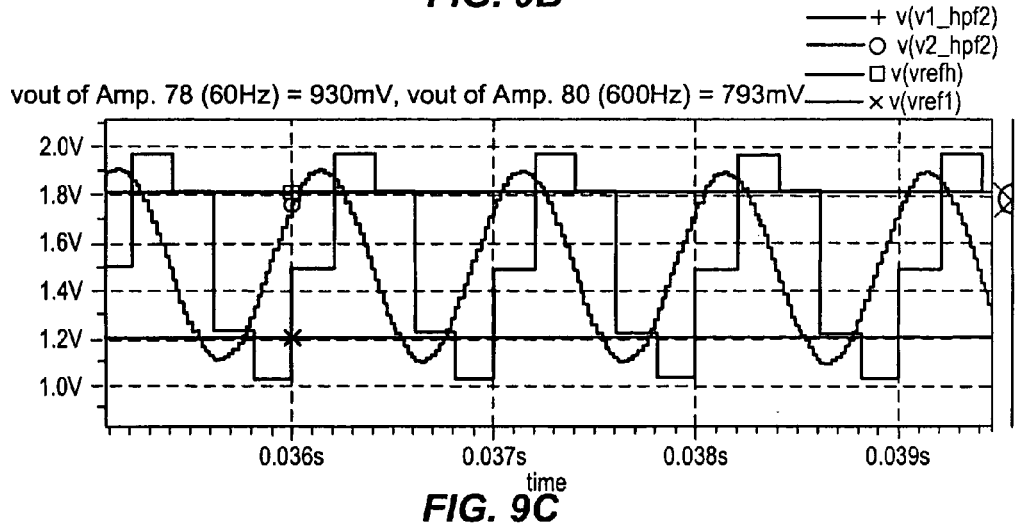
Figure 10A:
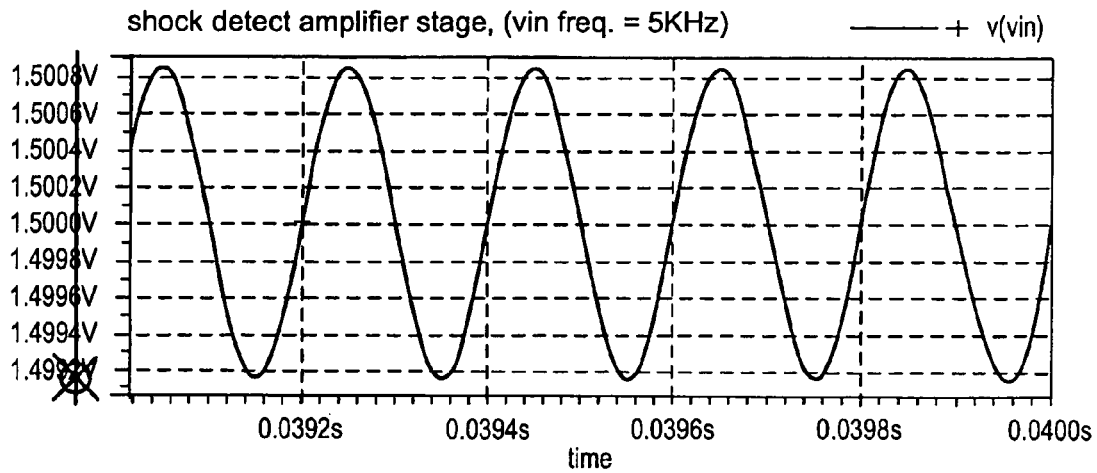
Figure 10B:
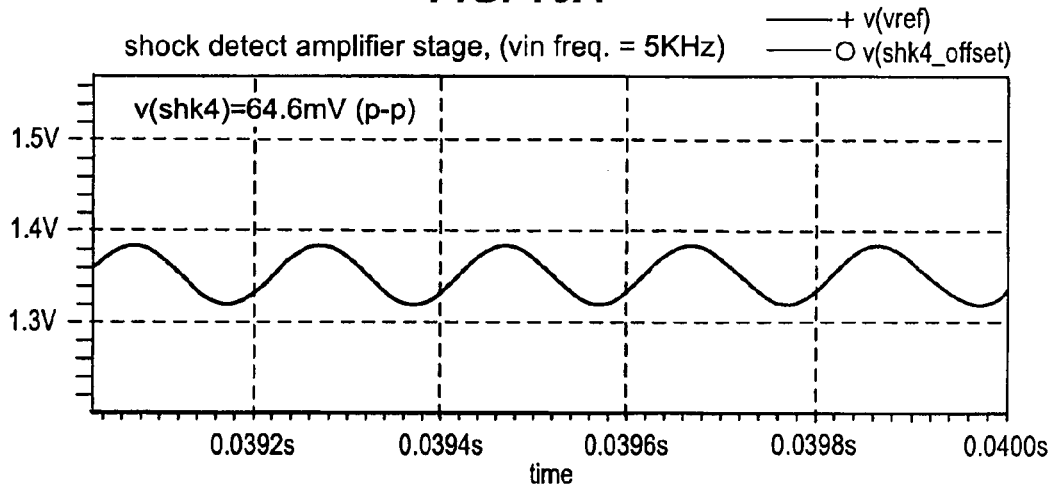
Figure 10C:
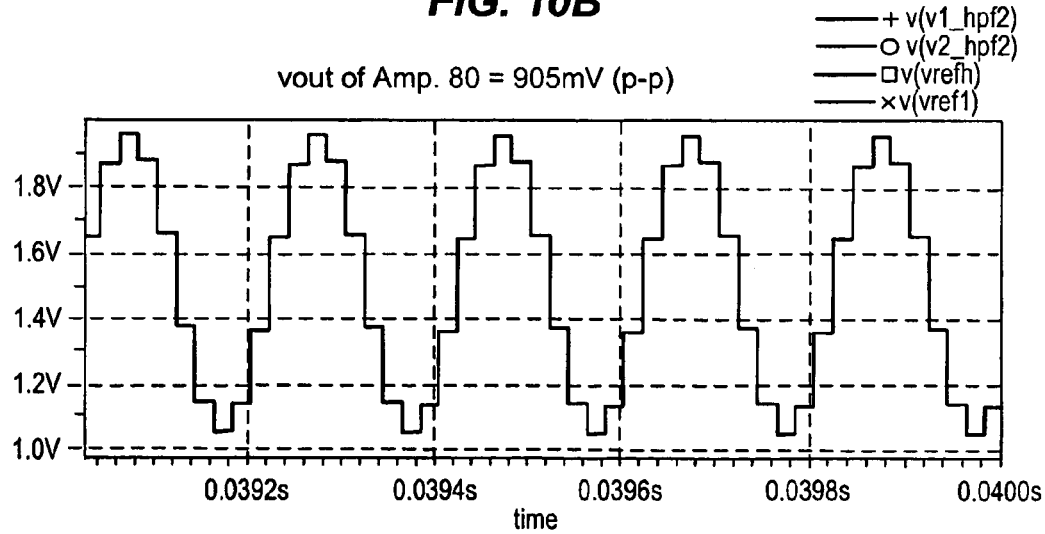
Figure 11A:
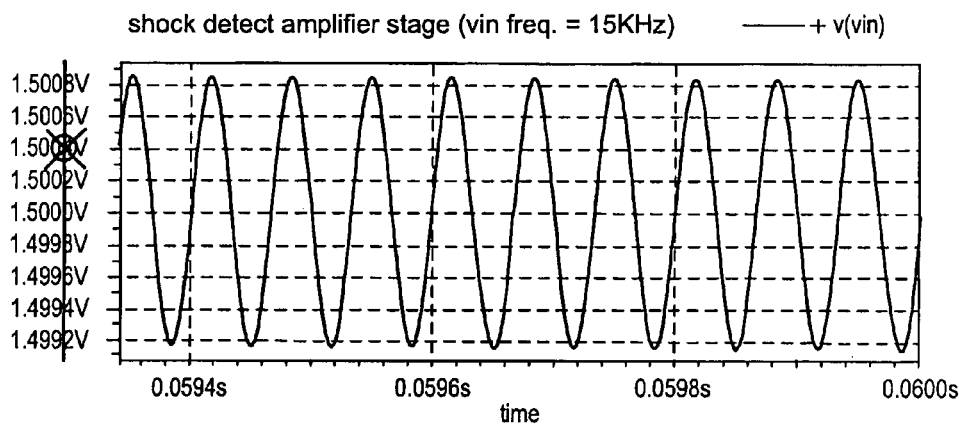
Figure 11B:
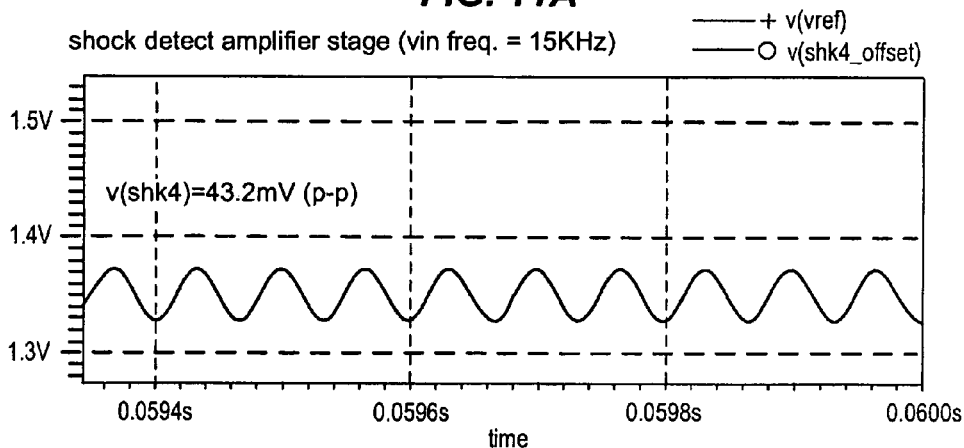
Figure 11C:
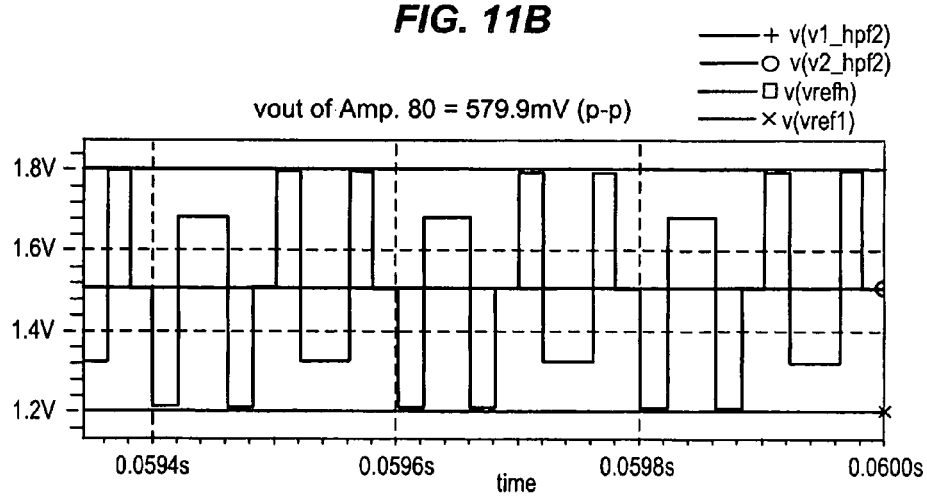

FIGS. 9-11 show similar results for the other frequencies. Note that, in FIG. 11C, aliasing is present because the frequency is too low (50K). A preferred simulation would have been approximately 100K. The point of FIG. 11C is to illustrate that the peak values are okay, within the upper and lower thresholds of the comparators, 1.8V and 1.2V, respectively.

The present invention may be embodied in different forms than those discussed above. In addition to the circuits shown, the invention could be implemented with means for amplifying a shock detector transducer, means for filtering the amplified signal with a first switched capacitor circuit and means for filtering the amplified signal with a second switched capacitor circuit having a different cut-off frequency.

At the input, there can be further provided means for detecting a shock and providing a shock detector signal and means for low pass filtering the shock detector signal. Also provided are means for converting the shock detector signal into a voltage signal, means for comparing an output of the first and second switched capacitor filters to a voltage reference and means for performing a Boolean logic function, in particular an OR function, on the comparison result. Additionally, the invention can provide means for providing overlapping passbands for the two switched capacitor filters and means for providing second order amplification and filtering with all the amplifying and filtering means.

In addition, means can be provided for providing a cut-off frequency in the range of 5-25 KHz, more preferably 15 KHz for the first switched capacitor filter and means for providing a cut-off frequency in the range of 40-80 KHz for the second switched capacitor filter column or preferably 60 KHz.

As noted above, in one embodiment, the cut-off frequencies are 15 and 60 KHz for the two switched capacitor filters, respectively. Alternately, other frequency values could be used depending upon the particular application. For example, a frequency within the range of 5-25 KHz or within the range of 5-50 KHz could be used for the first switched capacitor filter, and a range of 40-80 KHz or a range of 30-100 KHz could be used for the second switched capacitor filter.

Although embodiments have been shown for a shock detector for a disk drive, the circuit of the invention can be used in any motion detection circuitry and in particular shock detection circuitry for other types of devices. For example, the disk drive could either be a hard disk drive or a digital versatile disk drive. Alternately, the circuit could be in a high definition television, a vehicle, a cell phone or other mobile device, a set-top box, a media player, a VoIP player or any other electronic device.

Figure 12A:
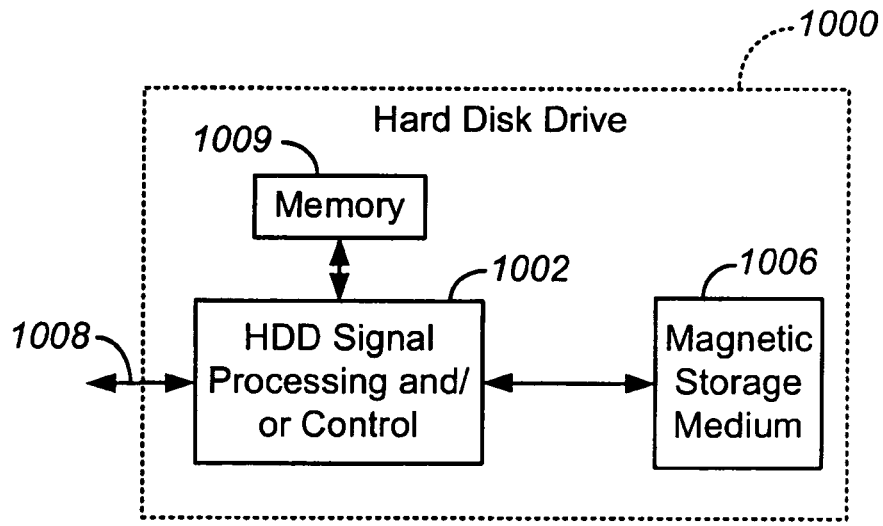
FIGS. 12A-12H show various devices in which the present invention may be embodied.

Referring now to FIGS. 12A-12G, various exemplary implementations of the present invention are shown. Referring to FIG. 12A, the present invention may be embodied in a hard disk drive 1000. The present invention may implement either or both signal processing and/or control circuits, which are generally identified in FIG. 12A at 1002. In some implementations, signal processing and/or control circuit 1002 and/or other circuits (not shown) in HDD 1000 may process data, perform coding and/or encryption, perform calculations, and/or format data that is output to and/or received from a magnetic storage medium 1006.

HDD 1000 may communicate with a host device (not shown) such as a computer, mobile computing devices such as personal digital assistants, cellular phones, media or MP3 players and the like, and/or other devices via one or more wired or wireless communication links 1008. HDD 1000 may be connected to memory 1009, such as random access memory (RAM), a low latency nonvolatile memory such as flash memory, read only memory (ROM) and/or other suitable electronic data storage.

Figure 12B:
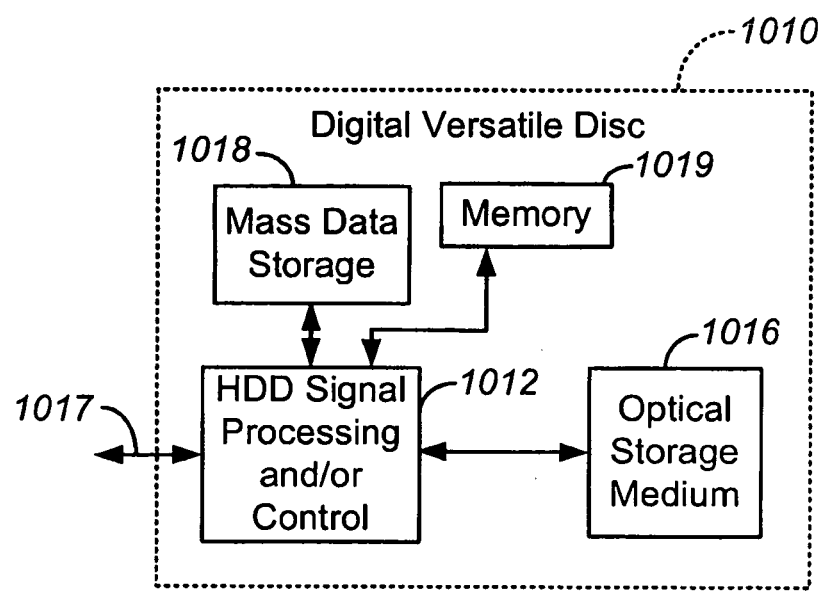

Referring now to FIG. 12B, the present invention may be embodied in a digital versatile disc (DVD) drive 1010. The present invention may implement either or both signal processing and/or control circuits, which are generally identified in FIG. 12B at 1012, and/or mass data storage 1018 of DVD drive 1010. Signal processing and/or control circuit 1012 and/or, other circuits (not shown) in DVD 1010 may process data, perform coding and/or encryption, perform calculations, and/or format data that is read from and/or data written to an optical storage medium 1016. In some implementations, signal processing and/or control circuit 1012 and/or other circuits (not shown) in DVD 1010 can also perform other functions such as encoding and/or decoding and/or any other signal processing functions associated with a DVD drive.

DVD drive 1010 may communicate with an output device (not shown) such as a computer, television or other device via one or more wired or wireless communication links 1017. DVD 1010 may communicate with mass data storage 1018 that stores data in a nonvolatile manner. Mass data storage 1018 may include a hard disk drive (HDD) such as that shown in FIG. 13A. The HDD may be a mini HDD that includes one or more platters having a diameter that is smaller than approximately 1.8". DVD 1010 may be connected to memory 1019, such as RAM, ROM, low latency nonvolatile memory such as flash memory, and/or other suitable electronic data storage.

Figure 12C:
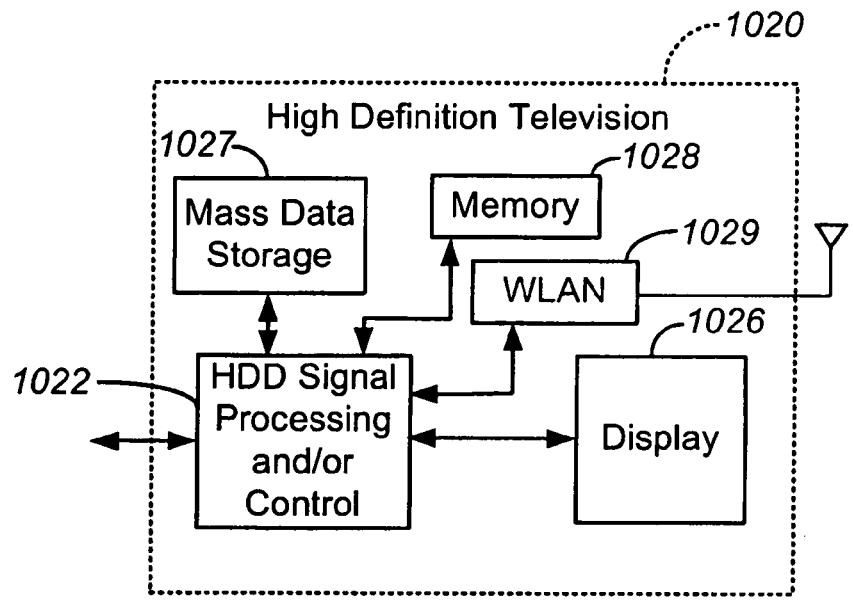

Referring now to FIG. 12C, the present invention may be embodied in a high definition television (HDTV) 1020. The present invention may implement either or both signal processing and/or control circuits, which are generally identified in FIG. 12C at 1022, a WLAN interface and/or mass data storage of the HDTV 1020. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with mass data storage 1027 that stores data in a nonvolatile manner such as optical and/or magnetic storage devices. At least one HDD may have the configuration shown in FIG. 12A and/or at least one DVD may have the configuration shown in FIG. 12B. The HDD may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029.

Figure 12D:
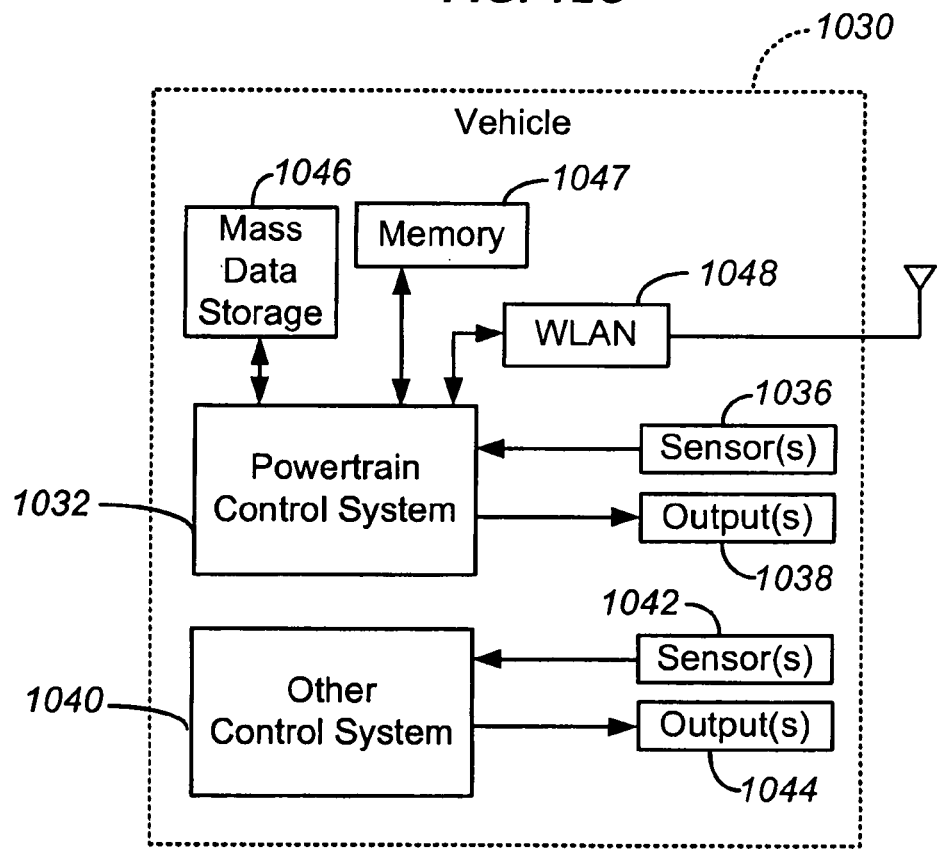

Referring now to FIG. 12D, the present invention implements a control system of a vehicle 1030, a WLAN interface and/or mass data storage of the vehicle control system. In some implementations, the present invention implements a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 1040 of vehicle 1030. Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1032 may communicate with mass data storage 1046 that stores data in a nonvolatile manner. Mass data storage 1046 may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown).

Figure 12E:
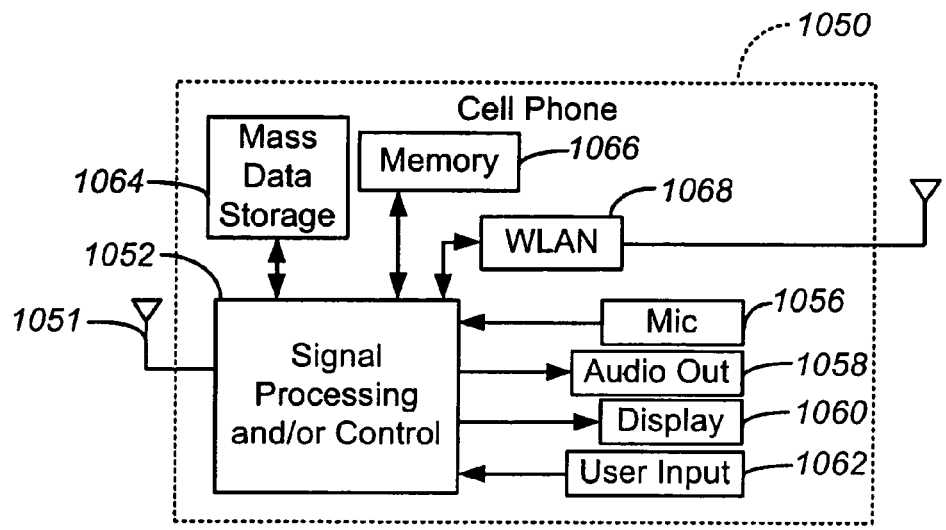

Referring now to FIG. 12E, the present invention may be embodied in a cellular phone 1050 that may include a cellular antenna 1051. The present invention may implement either or both signal processing and/or control circuits, which are generally identified in FIG. 12E at 1052, a WLAN interface and/or mass data storage of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions.

Cellular phone 1050 may communicate with mass data storage 1064 that stores data in a nonvolatile manner such as optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068.

Figure 12F:
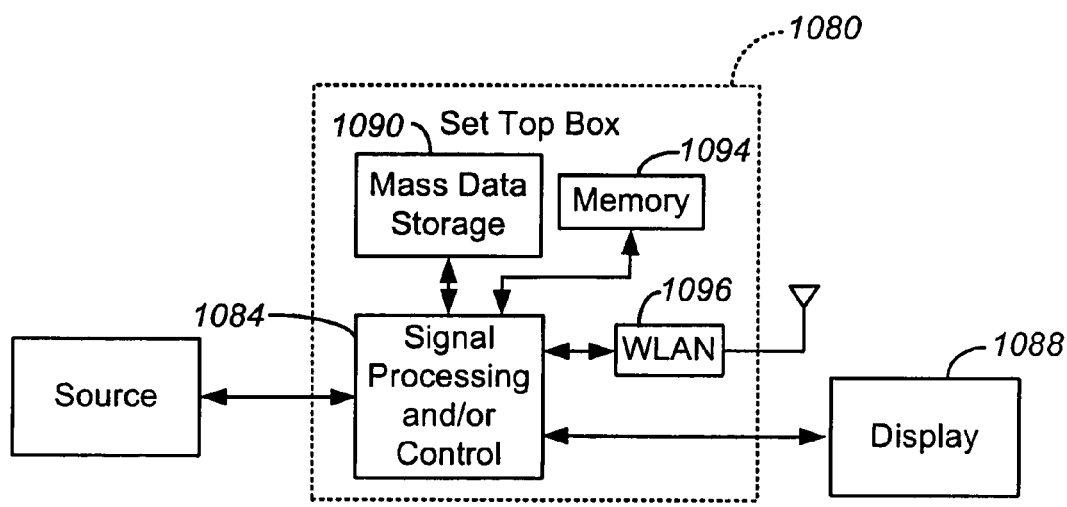

Referring now to FIG. 12F, the present invention may be embodied in a set top box 1080. The present invention may implement either or both signal processing and/or control circuits, which are generally identified in FIG. 12F at 1084, a WLAN interface and/or mass data storage of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function.

Set top box 1080 may communicate with mass data storage 1090 that stores data in a nonvolatile manner. Mass data storage 1090 may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096.

Figure 12G:
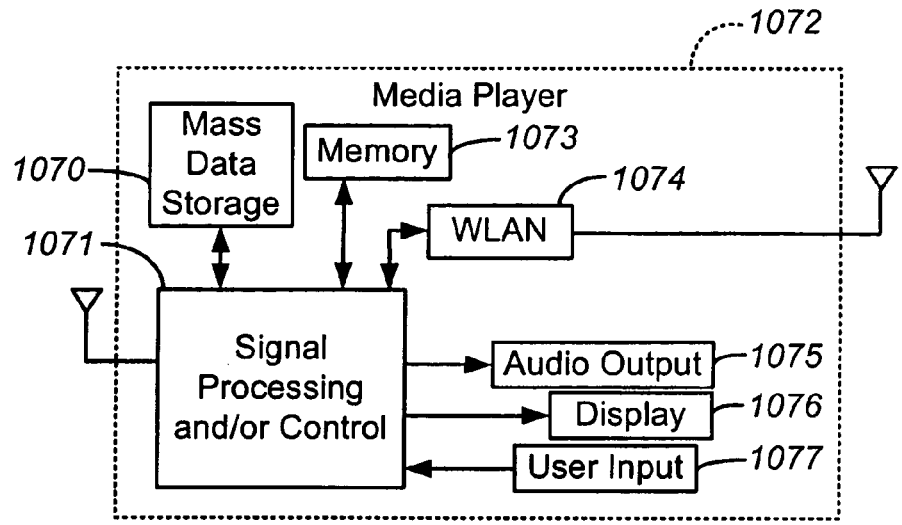

Referring now to FIG. 12G, the present invention may be embodied in a media player 1072. The present invention may implement either or both signal processing and/or control circuits, which are generally identified in FIG. 12G at 1071, a WLAN interface and/or mass data storage of the media player 1072. In some implementations, media player 1072 includes a display 1076 and/or a user input 1077 such as a keypad, touchpad and the like. In some implementations, media player 1072 may employ a graphical user interface (GUI) that typically employs menus, drop down menus, icons and/or a point-and-click interface via display 1076 and/or user input 1077. Media player 1072 further includes an audio output 1075 such as a speaker and/or audio output jack. Signal processing and/or control circuits 1071 and/or other circuits (not shown) of media player 1072 may process data, perform coding and/or encryption, perform calculations, format data and/or perform any other media player function.

Media player 1072 may communicate with mass data storage 1070 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". Media player 1072 may be connected to memory 1073 such as RAM, ROM, low latency nonvolatile memory such as flash memory and/or other suitable electronic data storage. Media player 1072 also may support connections with a WLAN via a WLAN network interface 1074.

Figure 12H:
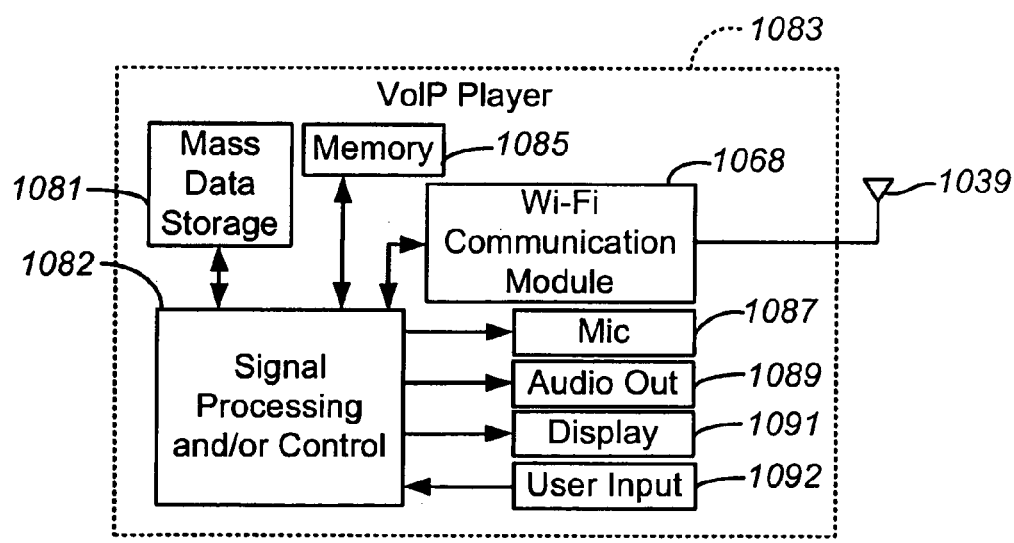

Referring to FIG. 12H, the present invention may be embodied in a Voice over Internet Protocol (VoIP) phone 1083 that may include an antenna 1039. The present invention may implement either or both signal processing and/or control circuits, which are generally identified in FIG. 12H at 1082, a wireless interface and/or mass data storage of the VoIP phone 1083. In some implementations, VoIP phone 1083 includes, in part, a microphone 1087, an audio output 1089 such as a speaker and/or audio output jack, a display monitor 1091, an input device 1092 such as a keypad, pointing device, voice actuation and/or other input devices, and a Wireless Fidelity (Wi-Fi) communication module 1086. Signal processing and/or control circuits 1082 and/or other circuits (not shown) in VoIP phone 1083 may process data, perform coding and/or encryption, perform calculations, format data and/or perform other VoIP phone functions.

VoIP phone 1083 may communicate with mass data storage 502 that stores data in a nonvolatile manner such as optical and/or magnetic storage devices, for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". VoIP phone 1083 may be connected to memory 1085, which may be a RAM, ROM, low latency nonvolatile memory such as flash memory and/or other suitable electronic data storage. VoIP phone 1083 is configured to establish communications link with a VoIP network (not shown) via Wi-Fi communication module 1086. Still other implementations in addition to those described above are contemplated.

As will be understood by those of skill in the art, the present invention could be embodied in other specific forms without departing from the essential characteristics thereof. For example, instead of a two switched capacitor filters in parallel, three or more switched capacitor filters in parallel could be used to give a more extended range for the passband. Accordingly, the foregoing description is intended to be illustrative, but not limiting, of the scope of the invention, which is set forth in the following claims.

What is claimed is:

1. A shock detector circuit on an integrated circuit comprising:
    an operational amplifier;
    a first switched capacitor high pass filter coupled to an output of said operational amplifier and having a first cutoff frequency;
    a second switched capacitor high pass filter coupled to the output of said operational amplifier and having a second cutoff frequency;
    a first comparator circuit coupled to an output of said first switched capacitor high pass filter; and
    a second comparator circuit coupled to an output of said second switched capacitor high pass filter.

2. The circuit of claim 1 further comprising:
    a shock detector transducer input; and
    a low pass filter coupled between said shock detector transducer input and said operational amplifier.

3. The circuit of claim 2 further comprising:
    a current to voltage converter coupled between said shock detector transducer input and said low pass filter.

4. The circuit of claim 1 further comprising:
    a Boolean logic circuit coupled to outputs of said first and second comparator circuits.

5. The circuit of claim 1 wherein said operational amplifier provides a first stage gain and said first and second switched capacitor high pass filters provide a second stage gain.

6. The circuit of claim 1 wherein:
    said first switched capacitor high pass filter has a cutoff frequency in a range of 5-25 kHz; and
    said second switched capacitor high pass filter has a cutoff frequency in a range of 40-80 kHz.

7. The circuit of claim 1 wherein passbands of said first and second switched capacitor high pass filters overlap.

8. The circuit of claim 1 wherein said operational amplifier and said first and second switched capacitor high pass filters are configured to exhibit second order filter characteristics.

9. A shock detector circuit on an integrated circuit comprising:
- a shock detector transducer input;
- a current to voltage converter coupled to said shock detector transducer input;
- a low pass filter coupled to said current to voltage converter;
- an operational amplifier coupled to said low pass filter;
- a first switched capacitor high pass filter coupled to an output of said operational amplifier and having a first cutoff frequency;
- a second switched capacitor high pass filter coupled to the output of said operational amplifier and having a second cutoff frequency;
- a first comparator circuit coupled to an output of said first switched capacitor high pass filter;
- a second comparator circuit coupled to an output of said second switched capacitor high pass filter; and
- a Boolean logic circuit coupled to respective outputs of said first and second comparator circuits.

10. The circuit of claim 9 wherein:
- said first switched capacitor high pass filter has a cutoff frequency in a range of 5-25 kHz; and
- said second switched capacitor high pass filter has a cutoff frequency in a range of 40-80 kHz.

11. A method for providing shock detection comprising:
- amplifying a shock detector transducer signal to produce an amplified signal with a DC offset;
- filtering said amplified signal with a first switched capacitor high pass filter having a first cutoff frequency;
- filtering said amplified signal with a second switched capacitor high pass filter having a second cutoff frequency;
- comparing an output of said first switched capacitor high pass filter to a first voltage reference; and
- comparing an output of said second switched capacitor high pass filter to said first voltage reference.

12. The method of claim 11 further comprising:
- detecting a shock and providing a shock detector input signal; and
- low pass filtering said shock detector input signal.

13. The method of claim 12 further comprising: converting said shock detector input signal into a voltage signal.

14. The method of claim 11 further comprising:
- comparing the output of said first switched capacitor high pass filter to a first voltage reference;
- comparing the output of said second switched capacitor high pass filter to said first voltage reference; and
- performing a Boolean logic function on a result of said comparing.

15. The method of claim 11 wherein said filtering also provides amplification.

16. The method of claim 11 wherein:
- said first switched capacitor high pass filter has a cutoff frequency in a range of 5-25 kHz for; and
- said second switched capacitor high pass filter has a cutoff frequency in a range of 40-80 kHz for.

17. The method of claim 11 further comprising providing overlapping passbands for said first and second switched capacitor high pass filters.

18. The method of claim 11 wherein said amplifying and filtering are performed with circuits configured to exhibit second order amplification and filtering characteristics.

19. A method for providing shock detection comprising:
- detecting a shock and providing a shock detector input signal;
- low pass filtering said shock detector input signal;
- converting said shock detector input signal into a shock detector voltage signal;
- amplifying said shock detector voltage signal to produce an amplified signal with DC offset;
- filtering said amplified signal with a first switched capacitor high pass filter having a first cutoff frequency;
- filtering said amplified signal with a second switched capacitor high pass filter having a second cutoff frequency;
- comparing an output of said first switched capacitor high pass filter to a first voltage reference;
- comparing an output of said second switched capacitor high pass filter to said first voltage reference; and
- performing a Boolean logic function on a result of said comparing.

20. The method of claim 19 further comprising:
- providing a cutoff frequency in a range of 5-25 kHz for said first switched capacitor high pass filter; and
- providing a cutoff frequency in a range of 40-80 kHz for said second switched capacitor high pass filter.

* * * * *